(12) United States Patent
Kuranoshita

(10) Patent No.: US 8,582,166 B2
(45) Date of Patent: Nov. 12, 2013

(54) IMAGE-DATA GENERATION METHOD, IMAGE-DATA GENERATION APPARATUS AND STORAGE MEDIUM OF STORING IMAGE-DATA GENERATION PROGRAM

(75) Inventor: Masashi Kuranoshita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 670 days.

(21) Appl. No.: 12/830,586

(22) Filed: Jul. 6, 2010

(65) Prior Publication Data

US 2011/0007360 A1 Jan. 13, 2011

(30) Foreign Application Priority Data

Jul. 9, 2009 (JP) .................................. 2009-163029

(51) Int. Cl.
*G06F 15/00* (2006.01)
(52) U.S. Cl.
USPC ........................................................ 358/1.18
(58) Field of Classification Search
USPC ........................................................ 358/1.18
See application file for complete search history.

(56) References Cited

U.S. PATENT DOCUMENTS

2009/0219571 A1 9/2009 Saito
2009/0310167 A1* 12/2009 Sugimoto .................... 358/1.15

FOREIGN PATENT DOCUMENTS

| JP | 2007-249403 A | 9/2007 |
| JP | 2008-158957 A | 7/2008 |
| JP | 2009-4912 A | 1/2009 |
| JP | 2009-208315 A | 9/2009 |

OTHER PUBLICATIONS

Ushio, "Search for the Essence of Workflow", Printing and Publishing Research Institute, Co. Ltd., vol. 67, No. 12, Dec. 1, 2007, pp. 24-25 (with partial English translation).

* cited by examiner

*Primary Examiner* — Saeid Ebrahimi Dehkordy
(74) *Attorney, Agent, or Firm* — Birch, Stewart, Kolasch & Birch, LLP

(57) ABSTRACT

Before CTP-use image data TIFF that is laid out on a sheet of first paper used for printing and having a large size is produced based on image data (PDL) per page, CTP-use layout setting information (JDF) is converted so that POD-use layout setting information is produced, and image data laid out for POD is created based on the POD-use layout setting information.

17 Claims, 17 Drawing Sheets

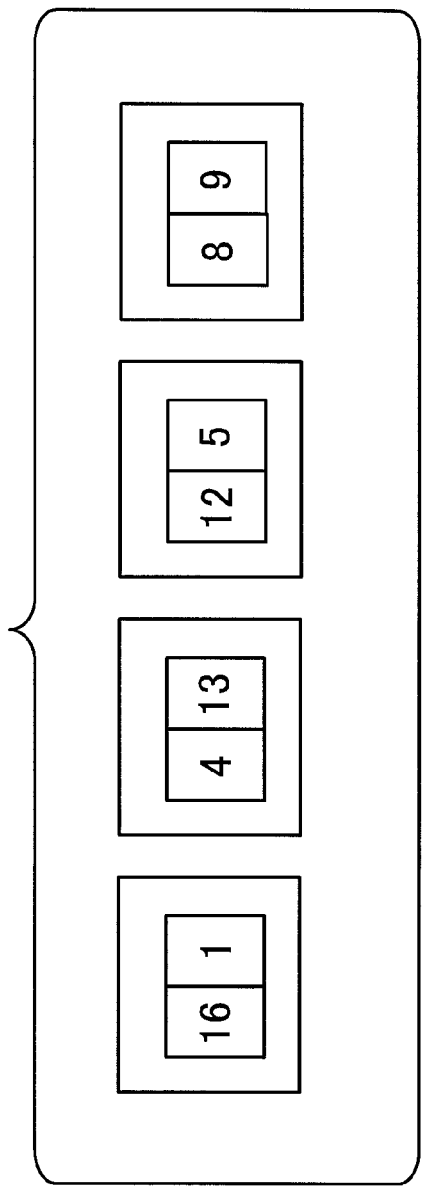

IMAGE-DATA GENERATION METHOD, IMAGE-DATA GENERATION APPARATUS AND STORAGE MEDIUM OF STORING IMAGE-DATA GENERATION PROGRAM

BACKGROUND OF THE INVENTION

1. Field of the Invention

The present invention relates to an image-data generation method and an image-data generation apparatus which edit image data prepared for printing and generate image data for a printer that prints out an image on a sheet of paper smaller in size than a sheet of printing paper. The present invention also relates to a storage medium of storing an image-data generation program that causes an arithmetic apparatus to operate as the image-data generation apparatus when executed in the arithmetic apparatus.

2. Description of the Related Art

When a multiple number of books are produced in earnest, there is adopted a process in which images for plural pages laid out on a sheet of large-size paper are printed, this sheet of paper is folded to form a signature, plural signatures according to the number of pages of the book are stacked, and the edges of those signatures are cut and thereby the signatures are bound for bookbinding.

Here, a presswork in making books is efficient for printing on multiple large-size sheets of paper. However, large-scaled preparations such as preparing and setting a printing plate in a press and the press is adjusted for the images are required before starting printing. In the past, it was necessary to produce a plate-making film in the presswork. In late years however, a technique of so-called CTP (Computer to Plots) for directly making a printing plate without producing the plate-making film has advanced. Nevertheless, the presswork is still a process that takes great manpower and a long time for preparations. Meanwhile, there is a demand to start full-scale production of multiple books after making a sample of the book and then checking the thickness, touching and the like of the sample.

In order to meet this demand, it has been conceived to produce a book serving as a sample and called a dummy, by printing out images of the respective pages of the book with a printer capable of performing printout more easily than the press and then by performing binding, before full-scale printing using the press is carried out. To realize this, it is necessary to generate image data laid out for output with the printer (see, for example, Japanese Patent Application Publication No. 2009-4912).

FIG. 1 is a diagram that illustrates an example of a method of generating image data laid out for output with a printer.

Here, CTP-use layout setting information (JDF: Job Definition Format) and original input data that is image data described in PDL (Page Description Language) are input into a RIP (Raster Image Processor), and thereby CTP-use image data in TIFF (Tagged Image File Format) laid out on a sheet of large-size paper for printing is generated. The technique of Japanese Patent Application Publication No. 2009-4912 adopts a process to convert this CTP-use image data in TIFF into image data laid out for a printer.

In this way, a dummy in which an image is printed on each page is produced by generating the image data laid out for the printer, printing out images based on the image data, and performing bookbinding. Since the printer is used, this dummy is made in a much easier way than when the press is used.

SUMMARY OF THE INVENTION

If the method illustrated in FIG. 1 is adopted to generate the image data laid out for the printer, it is necessary to input the CTP-use image data, which has been converted to a raster image, into a device that carries out layout for the printer, and consequently, there is a problem because it takes a long time to input the data and thus the efficiency of the processing is poor.

Further, in the method illustrated in FIG. 1, even when, for example, it is necessary to replace an image with a corrected image for only one page, merely replacing a single image for the replacement is not enough. In this case, all the images including this single image laid out on a single sheet of large-size paper for printing need to be rasterized with the RIP again to be converted into CTP-use image data and thus, the processing for replacement is inefficient. Furthermore, when the bleed width, the amount of creep or the like need to be finely adjusted or when a mark so-called crossmark indicating a cutting position or graphics so-called color mark for controlling density need to be deleted or shifted, it is also necessary to return to the stage before the RIP so as to create a JDF in which the bleed width or the amount of creep is finely adjusted or the crossmark or color mark is deleted or subjected to positional adjustment, and then the rasterization with the RIP is carried out again. In this way, according to the method illustrated in FIG. 1, it is extremely inconvenient and takes a long time to make various fine adjustments for producing the dummy with the printer.

In view of the foregoing, it is an object of the present invention to provide an image-data generation method and an image-data generation apparatus which efficiently create image data laid out for a printer and readily make a fine adjustment, and also provides a storage medium of storing an image-data generation program that causes an arithmetic apparatus to operate as the image-data generation apparatus.

An image-data generation method achieving the above object includes:

a data acquisition step of acquiring first layout data that defines layout on a sheet of first paper and first image data described per page;

a layout-data generation step of generating, based on the first layout data, second layout data that defines layout on a sheet of second paper having a size smaller than a size of the first paper; and an image-data generation step of generating, based on the first image data and the second layout data, second image data that represents an image per single side of the sheet of the second paper when an image for each page represented by the first image data is laid out on the sheet of the second paper according to the second layout data.

In the image-data generation method of the present invention, before image data (for example, CTP-use image data (TIFF) illustrated in FIG. 1) laid out on a sheet of the first paper is created based on the first image data, the first layout data (for example, CTP-use layout setting information (JDF) illustrated in FIG. 1) is converted so that the second layout data (for example, layout setting information (JDF) for a printer) is produced, and the second image data (for example, image data laid out for the printer) is created based on the second layout data. Therefore, it is possible to create the second image data efficiently, and revision and the like may be readily carried out.

Here, in the image-data generation method of the present invention, it is preferable that the layout-data generation step includes:

a first change step of changing the first layout data to third layout data in which one signature is set per sheet of the first paper;

a second change step of changing the third layout data to fourth layout data in which side-stitching is changed to saddle-stitching per sheet of the first paper; and a layout-data conversion step of converting the fourth layout data into the second layout data.

Through this procedure, the first layout data may be converted into the second layout data precisely.

In the image-data generation method of the present invention, the image-data generation step is a step of generating the second image data that represents a bitmap. However, the image-data generation step in the image-data generation method of the present invention may be a step of generating the second image data in PDL format instead of using bitmap data.

Further, the image-data generation apparatus of the present invention includes:

a data acquisition section that acquires first layout data that defines layout on a sheet of first paper and first image data described per page;

a layout-data generation section that generates, based on the first layout data, second layout data that defines layout on a sheet of second paper having a size smaller than a size of the first paper; and an image-data generation section that generates, based on the first image data and the second layout data, second image data that represents an image per single side of the sheet of the second paper when an image for each page represented by the first image data is laid out on the sheet of the second paper according to the second layout data.

Here, in the image-data generation apparatus of the present invention, it is preferable that the layout-data generation section includes:

a first change section that changes the first layout data to third layout data in which one signature is set per sheet of the first paper;

a second change section that changes the third layout data to fourth layout data in which side-stitching is changed to saddle-stitching per sheet of the first paper; and a layout-data conversion section that converts the fourth layout data into the second layout data.

Still further, in the image-data generation apparatus of the present invention, it is preferable that the image-data generation apparatus further includes:

a layout-data revision section that includes an operation section to be operated by an operator and revises the second layout data according to an operation of the operation section, wherein the image-data generation section generates the second image data according to the second layout data after revised by the layout-data revision section.

In this case, it is acceptable that the layout-data revision section revises a bleed width according an operation of the operation section, or the layout-data revision section revises an amount of creep according an operation of the operation section.

When the function of revising the second layout data is provided, it is possible to readily replace an image for one page, adjust the bleed width or the amount of creep, and delete or revise a crossmark or a color mark.

In the image-data generation apparatus of the present invention, it is acceptable that the image-data generation section typically generates the second image data that represents a bitmap. However, the image-data generation section in the image-data generation apparatus of the present invention may be a section that generates the second image data in PDL format instead of using bitmap data.

Furthermore, it is preferable that the image-data generation apparatus further includes an image-data transmission section that transmits the second image data generated in the image-data generation section to a printer that generates an image on the sheet of the second paper.

When image data being output in bitmap is output to the printer, it is possible to print out an image for a dummy with the printer.

Further, a storage medium achieving the above object is a storage medium of storing an image-data generation program that causes, when executed in an arithmetic apparatus, the arithmetic apparatus to operate as an image-data generation apparatus including:

a data acquisition section that acquires first layout data that defines layout on a sheet of first paper and first image data described per page;

a layout-data generation section that generates, based on the first layout data, second layout data that defines layout on a sheet of second paper having a size smaller than a size of the first paper; and an image-data generation section that generates, based on the first image data and the second layout data, second image data that represents an image per single side of the sheet of the second paper when an image for each page represented by the first image data is laid out on the sheet of the second paper according to the second layout data.

Here, it is preferable that the layout-data generation section includes:

a first change section that changes the first layout data to third layout data in which one signature is set per sheet of the first paper;

a second change section that changes the third layout data to fourth layout data in which side-stitching is changed to saddle-stitching per sheet of the first paper; and a layout-data conversion section that converts the fourth layout data into the second layout data.

In addition, in the storage medium of the present invention, it is preferable that the arithmetic apparatus further includes an operation section to be operated by an operator, the image-data generation program causes the arithmetic apparatus to operate as the image-data generation apparatus further comprising a layout-data revision section that revises the second layout data according to an operation of the operation section, and the image-data generation section generates the second image data according to the second layout data after revised by the layout-data revision section.

Here, it is acceptable that the layout-data revision section revises a bleed width according an operation of the operation section, or the layout-data revision section revises an amount of creep according an operation of the operation section.

Further, in the storage medium of the present invention, it is acceptable that the image-data generation section generates the second image data that represents a bitmap. Furthermore, it is further preferable that the image-data generation program causes the arithmetic apparatus to operate as the image-data generation apparatus further comprising an image-data transmission section that transmits the second image data generated in the image-data generation section to a printer that generates an image on the sheet of the second paper.

According to the present invention described above, image data laid out for a printer is created efficiently while being readily revisable.

BRIEF DESCRIPTION OF THE DRAWINGS

FIG. 17 is an explanatory diagram of the processing in step S606.

DETAILED DESCRIPTION OF THE INVENTION

Exemplary embodiments of the present invention will be described below.

Figure 2:
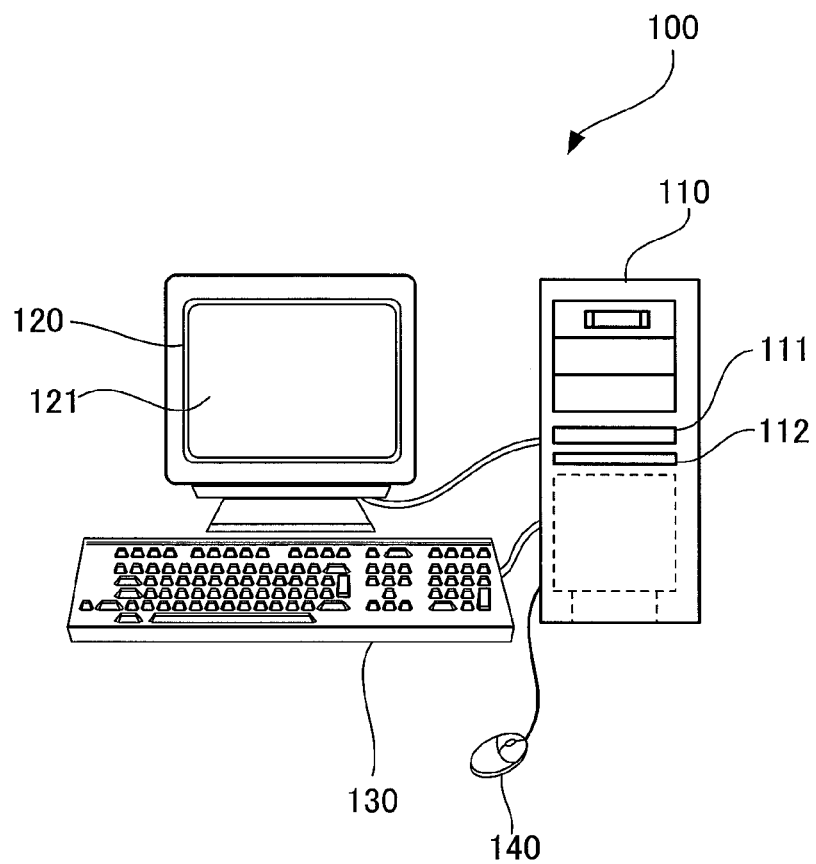
FIG. 2 is a diagram that illustrates a computer to which an embodiment of the present invention is applied.

FIG. 2 is a diagram that illustrates a computer 100 to which an embodiment of the present invention is applied.

The computer 100 illustrated in FIG. 2 outwardly includes a main unit 110, an image display device 120 that displays an image on a display screen 121 in response to an instruction from the main unit 110, a keyboard 130 for inputting information according to key operation into the main unit 110, and a mouse 140 for pointing at an arbitrary position on the display screen 121 to input an instruction according to that position.

The main unit 110 outwardly includes a flexible disk (hereinafter referred to as FD) loading port 111 and a CD-ROM loading port 112 into which a FD and a CD-ROM are to be loaded, respectively.

Figure 3:
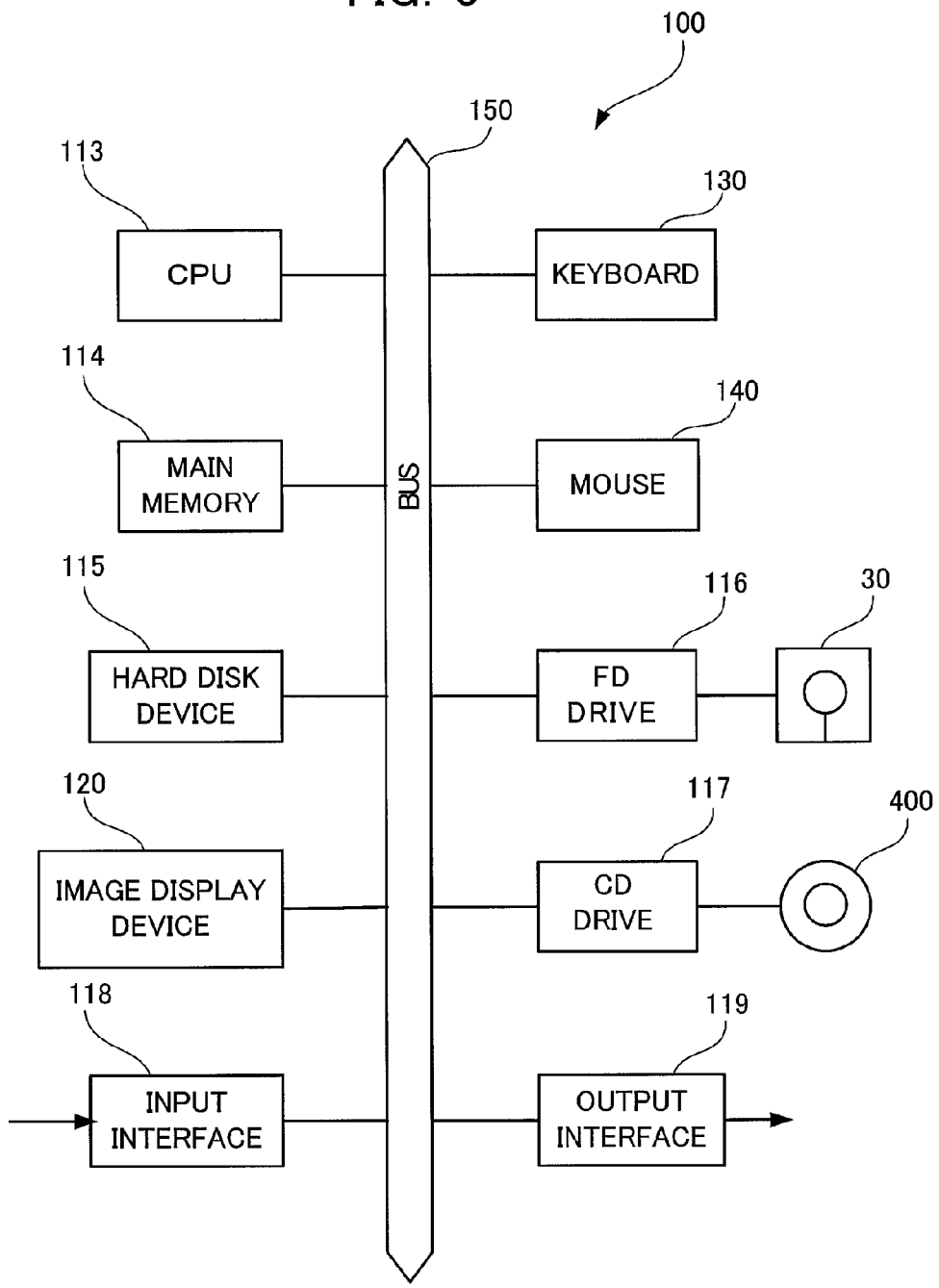
FIG. 3 is a diagram that illustrates a hardware structure of the computer illustrated in FIG. 2.

FIG. 3 is a diagram that illustrates a hardware structure of the computer illustrated in FIG. 2.

The main unit 110 illustrated in FIG. 2 includes a CPU 113, a main memory 114, a hard disk device (HDD) 115, a FD drive 116, a CD drive 117, an input interface 118 and an output interface 119. The CPU 113 executes various programs. A program stored in the HDD 115 is read into the main memory 114 and developed to be executed by the CPU 113. The HDD 115 keeps various programs and data. The FD drive 116 accesses a FD 30 loaded into the FD drive 116. The CD drive 117 accesses a CD-ROM 400 loaded into the CD drive 117. The input interface 118 is used for data input from an external device (here, an editing device that edits original input data (described later)), and the output interface 119 is used for data output to an external device (here, a printer for POD (Print On Demand)). These various kinds of hardware built in the main unit 110, the keyboard 130, the image display device 120 and the mouse 140 are interconnected by a bus 150.

The CD-ROM 400 stores an image-data generation program to be described later that causes a computer to operate as an embodiment of the image-data generation apparatus. When the CD-ROM 400 is loaded into the CD drive 117 and the image-data generation program stored in the CD-ROM 400 is uploaded to the computer 100, the image-data generation program is stored in the HDD 115. Subsequently, when this image-data generation program is started and executed, the computer 100 operates as an embodiment of the image-data generation apparatus according to the present invention.

Figure 4:
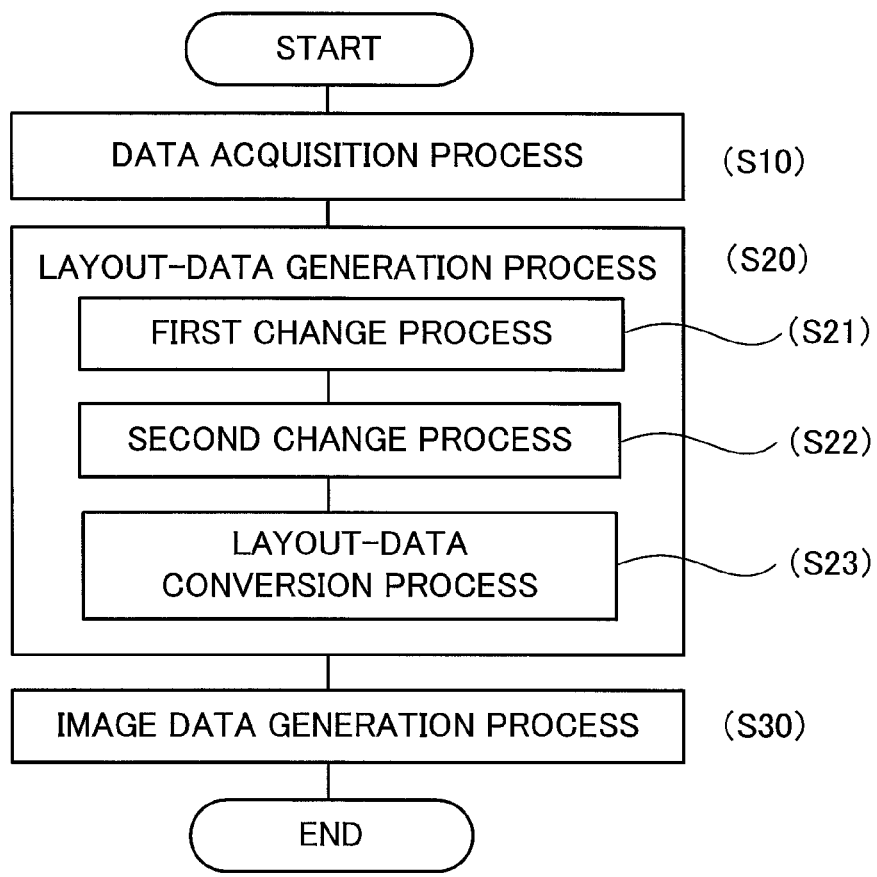
FIG. 4 is a flowchart that illustrates a summary of the image-data generation method as an embodiment implemented by the computer illustrated in FIG. 3.

FIG. 4 is a flowchart that illustrates a summary of the image-data generation method as an embodiment implemented by the computer illustrated in FIG. 3.

The image-data generation method illustrated here includes a data acquisition process (S10), a layout-data generation process (S20) and an image-data generation process (S30). Further, the layout-data generation process (S20) includes a first change process (S21), a second change process (S22) and a layout-data conversion process (S23).

In the data acquisition process (S10), first layout data that defines layout on a sheet of first paper of a large size used for a press and first image data that is described per page are acquired.

In the layout-data generation process (S20), second layout data is generated based on the first layout data. The second layout data defines layout on a sheet of second paper having a size smaller than the size of the first paper. The second paper is for a printer. To be more specific, in the first change process (S21) of the layout-data generation process (S10), the first layout data is changed to third layout data in which one signature is set per single sheet of the first paper. Subsequently, in the second change process (S22), the third layout data is changed to fourth layout data in which side-stitching is changed to saddle-stitching for each sheet of the first paper, and the fourth layout data is converted into the second layout data in the layout-data conversion process (S23).

Further, in the image-data generation process (S30), based on the first image data and the second layout data, there is generated second image data that represents, when an image of each page represented by the first image data is laid out on a sheet of the second paper, an image per single side of the sheet of the second paper. This image-data generation process (S30) is a process in which the second image data representing a bitmap is generated. However, in the image-data generation process (S30), the second image data of not only a bitmap but in PDL format may be generated.

Figure 5:
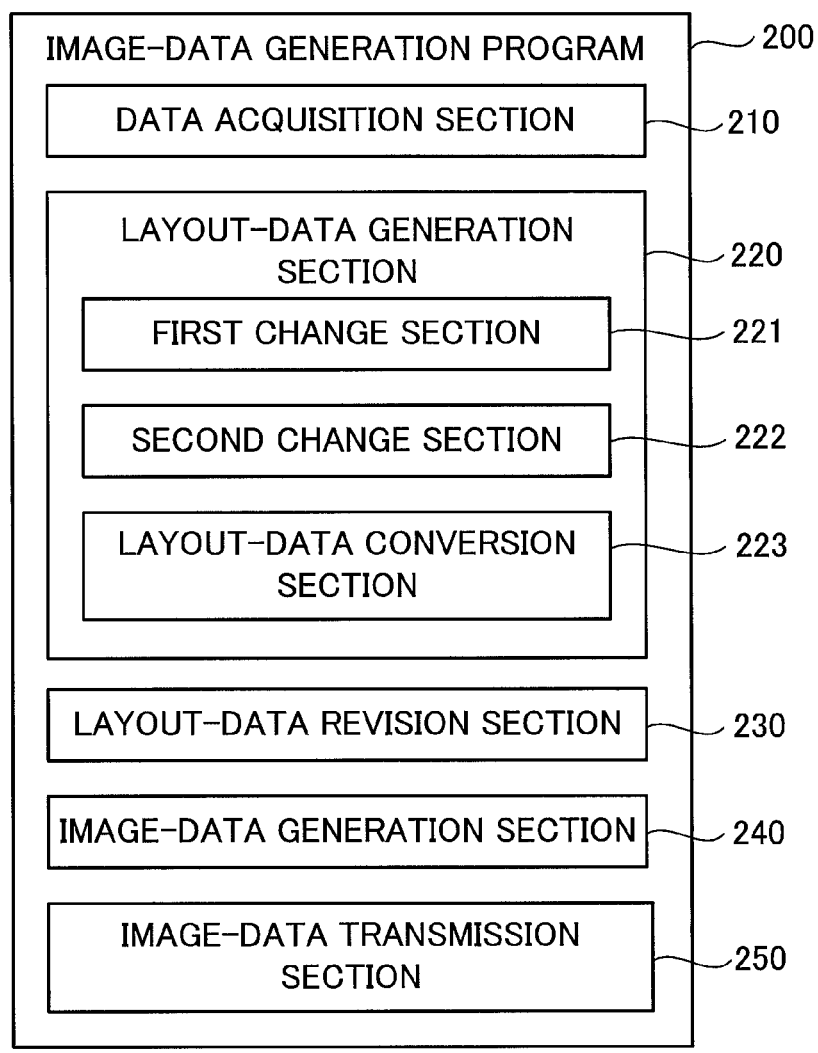
FIG. 5 is a flowchart of an image-data generation program 200 serving as an embodiment of the present invention.

FIG. 5 is a flowchart of an image-data generation program 200 serving as an embodiment of the present invention.

The image-data generation program 200 is a program that causes, when installed onto and executed by the computer 100 illustrated in FIG. 2 and FIG. 3, the computer 100 to operate as an embodiment of the image-data generation apparatus of the present invention. The image-data generation program 200 illustrated in FIG. 5 includes program components that respectively represent a data acquisition section 210, a layout-data generation section 220, a layout-data revision section 230, an image-data generation section 240 and an image-data transmission section 250. Further, the layout-data generation section 220 includes program components that respectively represent a first change section 221, a second change section 222 and a layout-data conversion section 223.

The operations of these program components will be described later.

Figure 6:
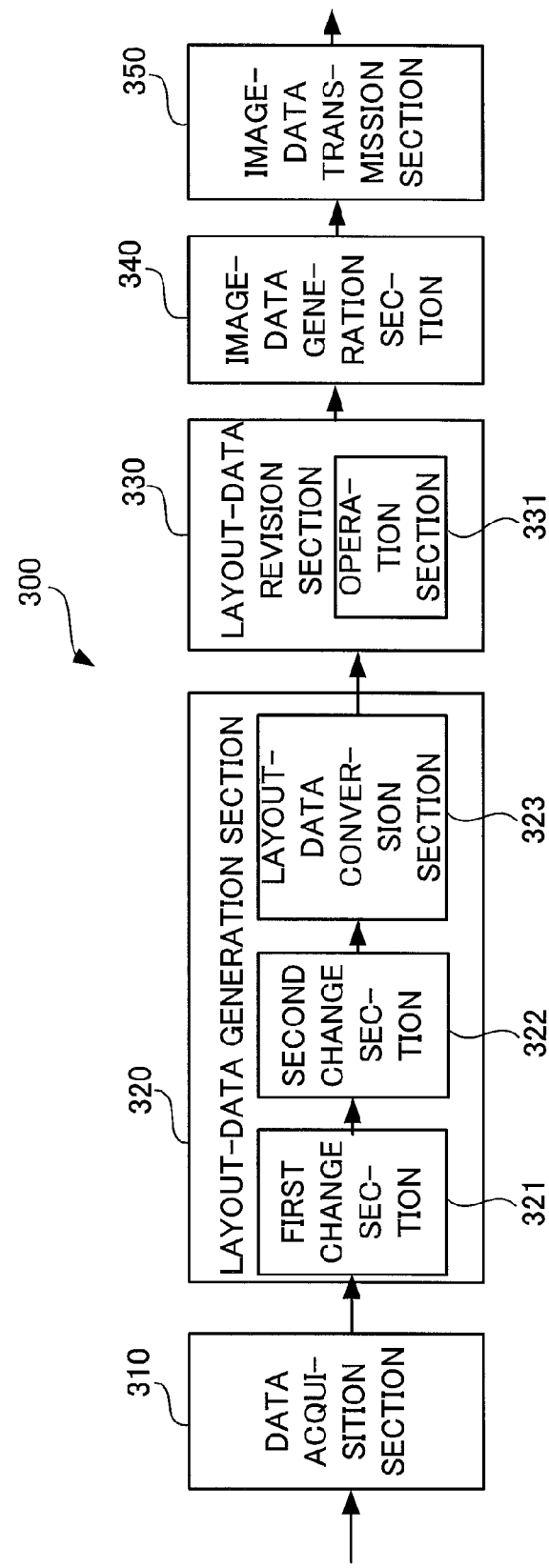
FIG. 6 is a functional block diagram of an image-data generation apparatus 300 serving as an embodiment of the present invention.

FIG. 6 is a functional block diagram of an image-data generation apparatus 300 serving as an embodiment of the present invention. This image-data generation apparatus 300 has functions implemented when the image-data generation program 200 illustrated in FIG. 5 is installed onto and executed by the computer 100 illustrated in FIG. 2 and FIG. 3.

The image-data generation apparatus 300 includes a data acquisition section 310, a layout-data generation section 320, a layout-data revision section 330, an image-data generation section 340 and an image-data transmission section 350. Furthermore, the layout-data generation section 320 includes a first change section 321, a second change section 322 and a layout-data conversion section 323.

The names of the respective sections illustrated in FIG. 6 are the same as those of the corresponding program components included in the image-data generation program 200 illustrated in FIG. 5. However, each section of the image-data generation apparatus 300 illustrated in FIG. 6 is a function implemented when the program component with the equivalent name in the image-data generation program 200 illustrated in FIG. 5 is executed in the computer 100 (see FIG. 2 and FIG. 3). Therefore, although the same names are used, each section illustrated FIG. 6 is a combination of the corresponding program component (software) illustrated in FIG. 5 and the hardware of the computer 100, whereas each program component illustrated in FIG. 5 refers to only the software of these software and hardware. The operation implemented when each program component included in the image-data generation program 200 illustrated in FIG. 5 is executed in the computer 100 is the operation of each section included in the image-data generation apparatus 300 illustrated in FIG. 6. Therefore, the following description of the operation of each section included in the image-data generation apparatus 300 illustrated in FIG. 6 will also serve as the description of each program component included in the image-data generation program 200 illustrated in FIG. 5.

The data acquisition section 310 acquires first layout data that defines layout on a sheet of first paper having a large size used for printing and first image data that is described per page.

Further, the layout-data generation section 320 generates second layout data based on the first layout data. The second layout data defines layout on a sheet of second paper having a size smaller than the size of the first paper. The second paper is for a printer.

Here, in the first change section 321 of the layout-data generation section 320, the first layout data is changed to third layout data in which one signature is set per single sheet of the first paper. Subsequently, in second change section 322, the third layout data is changed to fourth layout data in which side-stitching is changed to saddle-stitching for each sheet of the first paper. And then, the fourth layout data is converted into the second layout data in the layout-data conversion section 323.

Furthermore, the layout-data revision section 330 includes an operation section 331 (for example, the keyboard 130 and the mouse 140 illustrated in FIG. 2 and FIG. 3) operated by an operator, and revises the second layout data according to the operation of the operation section. In this layout-data revision section 330, a bleed width and an amount of creep are revised on the second layout data according to the operation of the operation section.

Subsequently, based on the first image data and the second layout data, the image-data generation section 340 generates second image data that represents, when an image of each page represented by the first image data is laid out on a sheet of the second paper according to the second layout data, an image per single side of the sheet of the second paper. The second layout data used here is the second layout data after the revision, when the second layout data is revised in the layout-data revision section 330. Here, the image-data generation section 340 generates the second image data that represents a bitmap. However, the image-data generation process section 340 may generate the second image data of not only a bitmap but in PDL format.

Afterwards, the image-data transmission section 350 transmits the second image data generated in the image-data generation section 340 to the printer that generates an image on the sheet of the second paper.

Next, a further specific embodiment of the present invention will be described.

Figure 7:
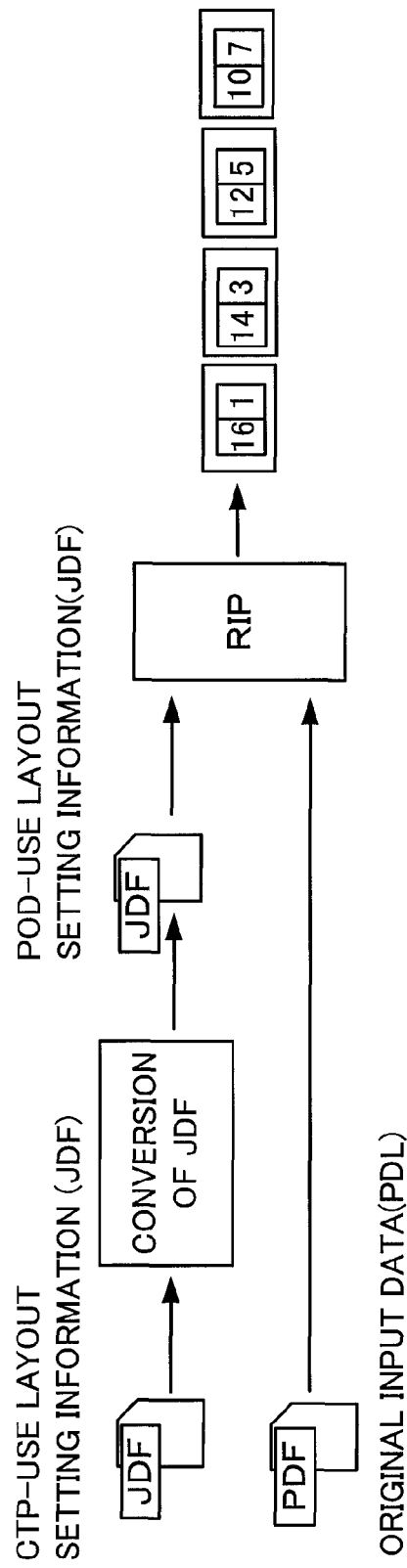
FIG. 7 is a diagram that illustrates a summary of a specific embodiment of the present invention.

FIG. 7 is a diagram that illustrates a summary of a specific embodiment of the present invention. Here, the summary of this embodiment will be described with reference to this FIG. 7.

Here, CTP-use layout setting information in JDF (Job Definition Format) is converted into POD-use layout setting information that is similarly in JDF. Here, the POD-use layout setting information is layout setting information for paper of small size used in a printer suitable for POD (Print On Demand).

As illustrated in FIG. 7, in the present embodiment, original input data (PDL) that has been input into a RIP is laid out based on POD-use layout setting information (JDF) and then rasterized and converted into image data. The image data created in this RIP is transmitted to a printer suitable for POD, which is not illustrated, and the printer suitable for POD prints out images based on the image data. Afterwards, paper sheets to which the images are output are folded so that signatures are formed and further, cutting and bookbinding are carried out so that a dummy is produced.

According to the embodiment illustrated in FIG. 7, the amount of input data is small, because the original input data in PDL before rasterized by the RIP is input. Further, since the CTP-use layout setting information is converted into the POD-use layout setting information, it is possible to adjust the bleed width and the amount of creep or readily delete or correct a crossmark or a color mark, by revising the POD-use layout setting information. Moreover, when an image for one page is replaced, only the original input data for that one page may be input again, and the RIP may perform rasterization again for only one side of a single sheet of small-size paper for the printer suitable for POD, which requires processing lighter than that of the conventional technique (see FIG. 1).

In this way, according to the embodiment illustrated in FIG. 7, the image data laid out for the printer suitable for POD is efficiently created and readily revised.

Next, a further specific embodiment will be described.

Figure 8:
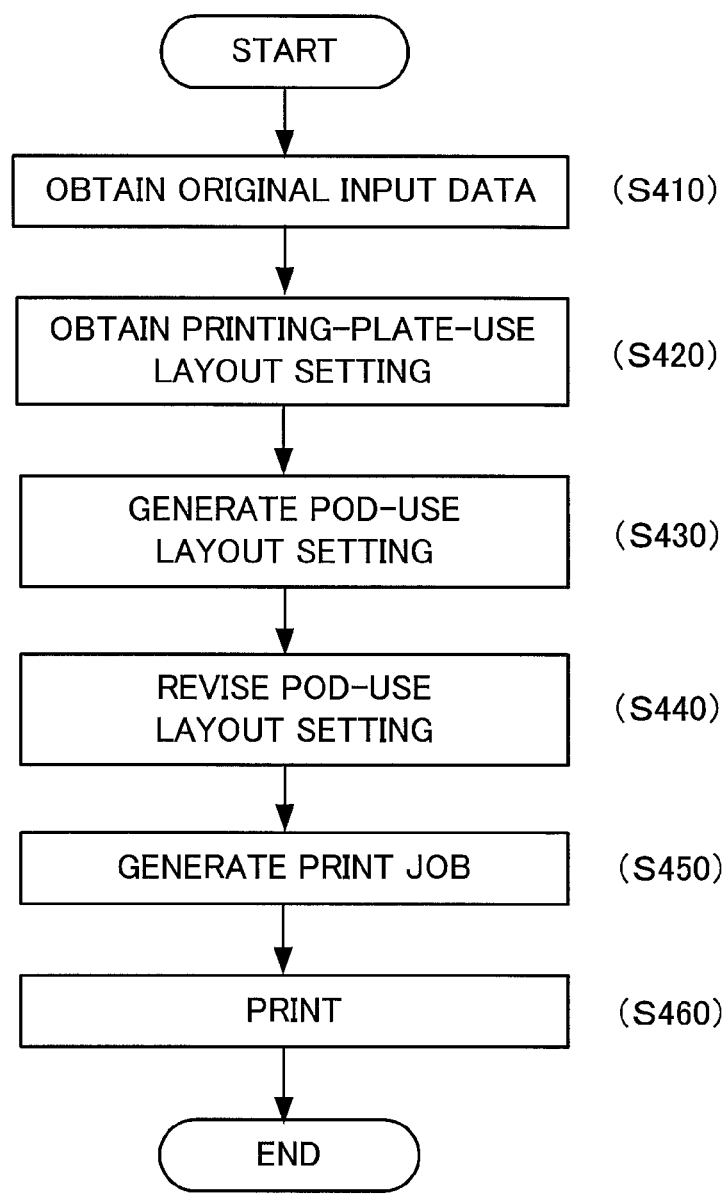
FIG. 8 is a flowchart that illustrates the processing of the present embodiment.
Figure 9:
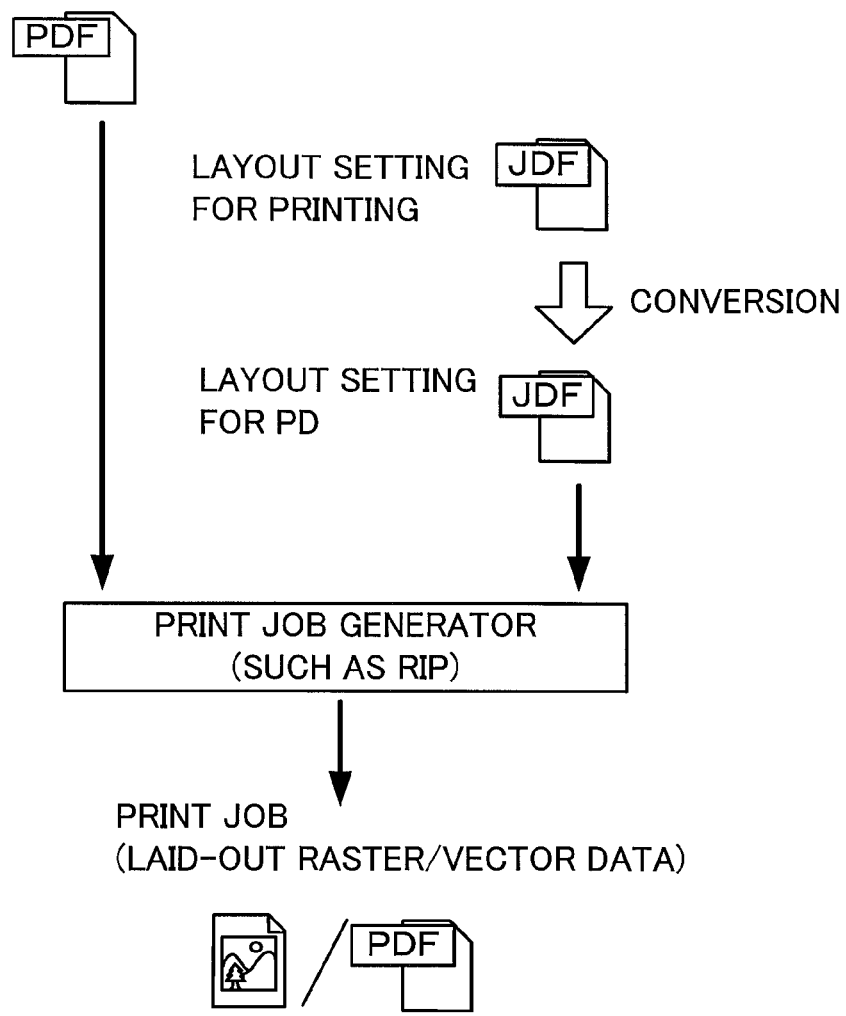
FIG. 9 is a diagram that illustrates a flow of the processing based on the flowchart illustrated in FIG. 8.

FIG. 8 is a flowchart that illustrates the processing of the present embodiment. Further, FIG. 9 is a diagram that illustrates a flow of the processing based on the flowchart illustrated in FIG. 8.

First, original input data, namely an original PDL file used for printing is obtained (S410). Next, printing-plate-use layout setting information (JDF) is obtained (S420), and POD-use layout setting information is generated based on the printing-plate-use layout setting information (S430). Further, the generated POD-use layout setting information is revised according to operation by a user (S440). Here, for example, a fine adjustment of a bleed width or an amount of creep is made. Subsequently, there is generated a print job that is an image data file in which the original input data is laid out based on this POD-use layout setting information and which is used for printing (printout) by a printer (S450). In the generation of this print job, when the printer planned to be used for the printing (print output) is a printer that receives raster data and prints an image based on the raster data, a print jot of raster data is generated and transmitted to the printer. On the other hand, when the printer planned to be used for the printing (printout) is a printer having a function of converting vector data (PDL) into raster data, vector data (PDL) laid out based on the POD-use layout setting information is generated, and transmitted to the printer. The printer then converts the received vector data (PDL) into raster data. In the printer, an image is printed (printed out) based on the received raster data or the raster data into which the vector data (PDL) has been converted. Afterwards, signatures are formed from paper sheets to which images are printed out and then, cutting and bookbinding are carried out, so that a dummy is produced.

Figure 1:
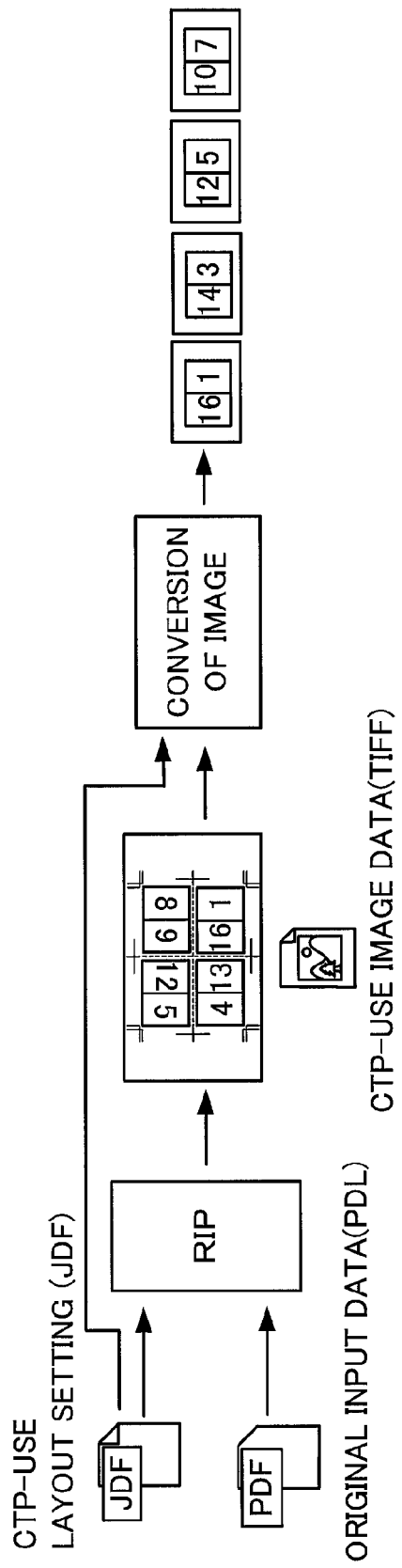
FIG. 1 is a diagram that illustrates an example of a method of generating image data laid out for output with a printer.

In the conventional technique illustrated in FIG. 1, raster data in which layout has been made for POD is created by using the rasterized data for printing plate and the printing-plate-use layout setting information. In contrast, in the embodiment illustrated in FIG. 8 and FIG. 9, like the embodiments previously described, the amount of receiving data is small because raster data in which layout is made for printing plate is unnecessary. Further, it is possible to readily respond to a change of layout setting such as replacement of the original input data and modification of the bleed width or the amount of creep.

Furthermore, in the conventional technique illustrated in FIG. 1, the data for POD after being subjected to the conversion is limited to the raster data for the purpose of receiving the raster data for printing plate. However, in the present embodiment, it is possible to generate not only the raster data laid out for POD but the vector data laid out for POD.

Next, there will be described an example of the conversion from the printing-plate-use layout setting information (JDF) into the POD-use layout setting information (JDF) in the embodiment illustrated in FIG. 8 and FIG. 9.

Figure 10:
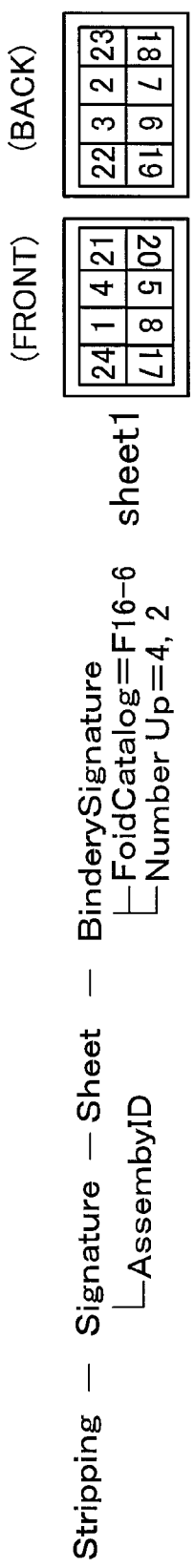
FIG. 10 is a diagram that illustrates an example of the printing-plate-use layout setting information (JDF)

FIG. 10 is a diagram that illustrates an example of the printing-plate-use layout setting information (JDF). Further, FIG. 11 is a diagram that illustrates an example of the POD-use layout setting information (JDF) that is created based on the printing-plate-use layout setting information (JDF) illustrated in FIG. 10.

Figure 11:
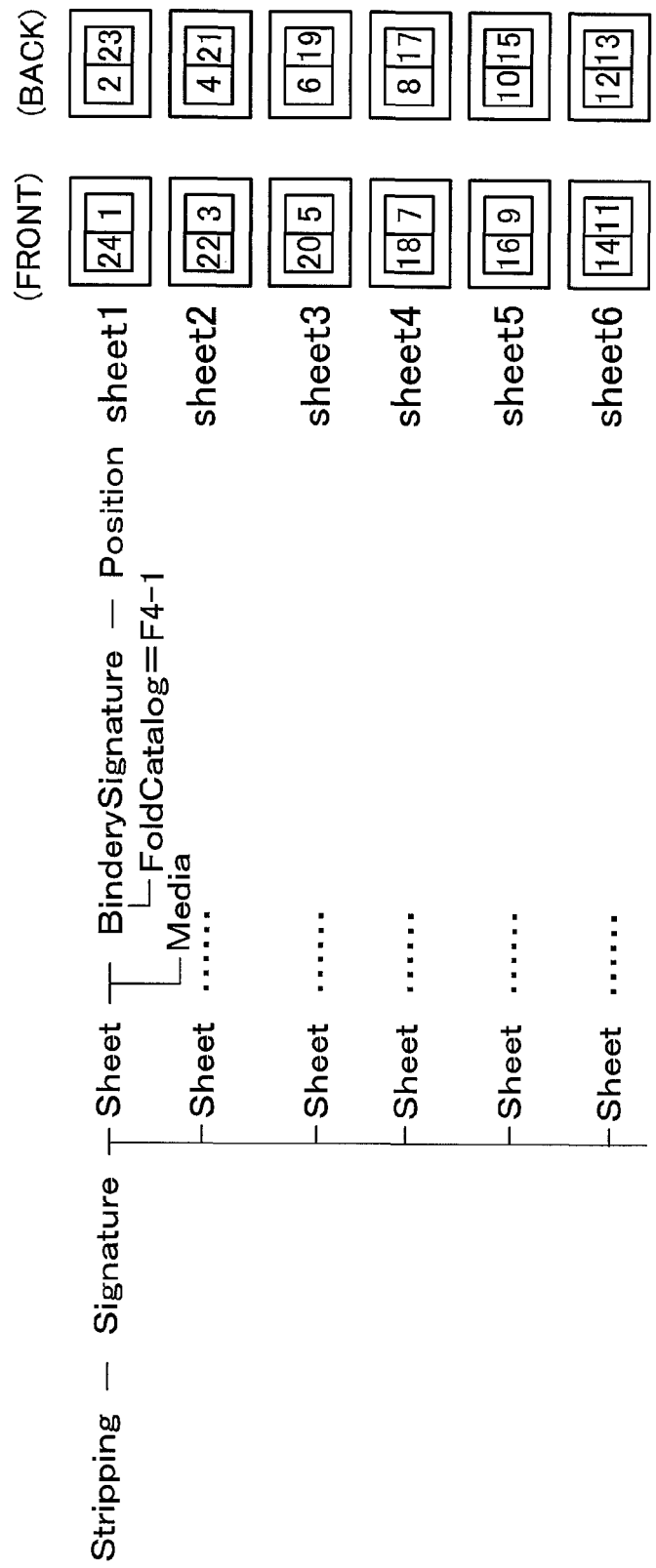
FIG. 11 is a diagram that illustrates an example of the POD-use layout setting information (JDF) that is created based on the printing-plate-use layout setting information (JDF) illustrated in FIG. 10.

JDF (Job Definition Format) includes multiple definitions other than those illustrated in FIG. 10 and FIG. 11. Here, however, there are illustrated only definitions required for conversion from the printing-plate-use layout setting information (JDF) into the POD-use layout setting information (JDF) for the example illustrated here.

In FIG. 10, "Stripping" refers to a route of the layout setting information, and "Signature" refers to a unit that represents a breakpoint of side-stitching/saddle-stitching. Further, "Sheet" represents one sheet of paper, and "BinderySignature" represents one signature. FIG. 10 depicts "AssembyID", and this "AssembyID" is one of attributes of "Signature" and used to identify the side-stitching and the saddle-stitching. Furthermore, "FoldCatalog" is one of attributes of "BinderySignature" and refers to the type of the signature. Here, "F16-6" is indicated as "FoldCatalog". "NumberUp" also is one of the attributes of "BinderySignature", and "4,2" means that one signature is formed by images aligned for four pages in each row and images aligned for two pages in each column per single side of a paper sheet.

The POD-use layout setting information (JDF) illustrated in FIG. 11 is similar to the printing-plate-use layout setting information (JDF) illustrated in FIG. 10. However, "Position" and "Media" that are not shown in FIG. 10 are indicated in FIG. 11. "Position" represents the position of an image in "BinderySignature". "Media" is located under "Sheet" on the same level as "BinderySignature" and is, for example, a definition of paper such as the size of the paper.

In FIG. 11, "F4-1" is indicated to define "FoldCatalog". This "F4-1" also represents, similar to "F16-6" in FIG. 10, one type of signature. Specifically, this "F4-1" represents the one type of signature when there are images for four pages on the front and back sides combined of one signature (two pages for each of the front and back sides).

On the right side of each of FIG. 10 and FIG. 11, an example of page layout on the front and back sides of one signature is illustrated. The vertical direction of each number on a page corresponds to the vertical direction of the image on that page. In FIG. 10, images for eight pages are arranged on each of the front and back sides of one signature, whereas in FIG. 11, images for two pages are arranged on each of the front and back sides of one signature.

Figure 12:
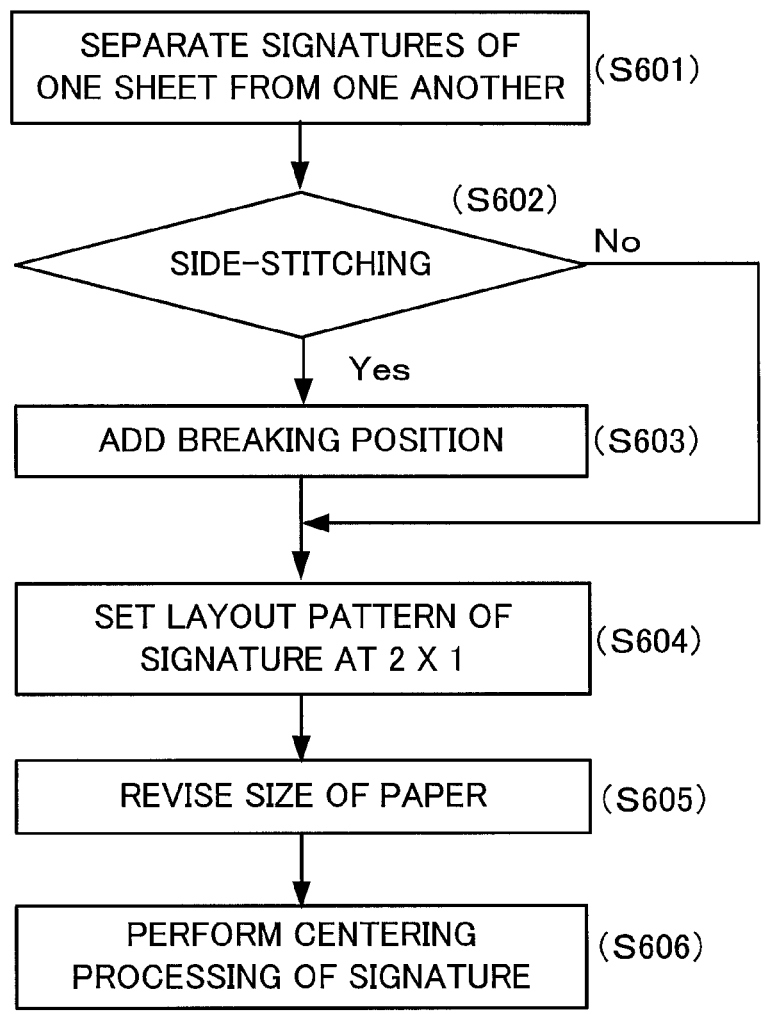
FIG. 12 is a flowchart that illustrates conversion processing from printing-plate-use layout setting information (see, for example, FIG. 10) into POD-use layout setting information (see, for example, FIG. 11)

FIG. 12 is a flowchart that illustrates conversion processing from printing-plate-use layout setting information (see, for example, FIG. 10) into POD-use layout setting information (see, for example, FIG. 11).

First, there is performed processing for separating signatures formed by one sheet of paper at the time of printing from one another (S601). There is a case where a sheet of paper at the time of printing has plural signatures, the sheet of paper is cut to produce each signature after the printing and then folded to produce the signatures. When there are plural signatures (BinderySignature) under one sheet of paper at the time of printing ("Sheet" in FIG. 10), this "Sheet" is divided so that there is only one signature (BinderySignature) under one "Sheet".

Figure 13:
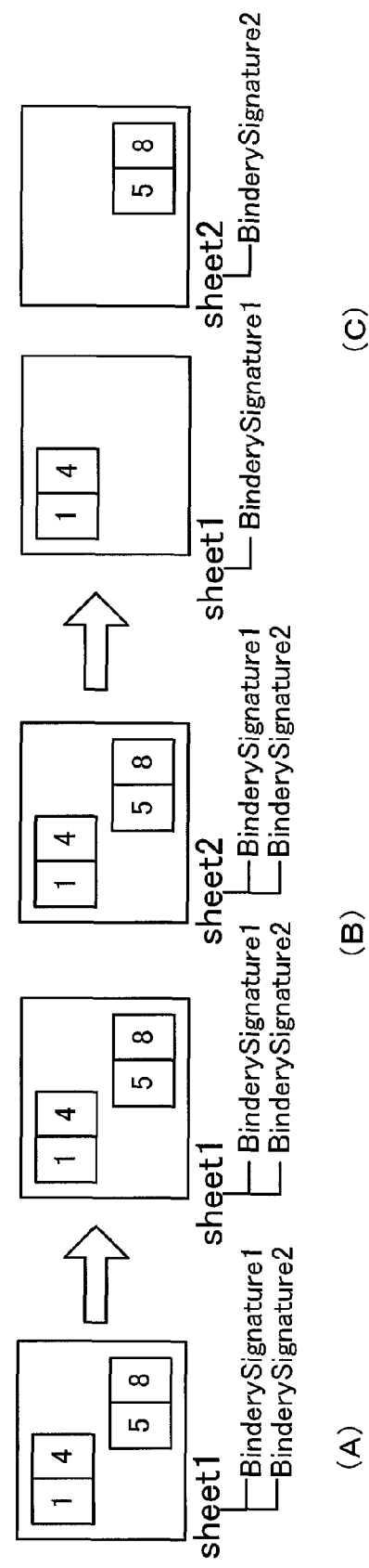
FIG. 13 is an explanatory diagram of processing at step S601 in FIG. 12.

FIG. 13 is an explanatory diagram of processing at step S601 in FIG. 12.

In the example illustrated in FIG. 10, there is only one "BinderySignature" under "Sheet". Therefore, another example is illustrated in FIG. 13.

In Part (A) of FIG. 13, there are "BinderySignature1" and "BinderySignature2" under one "Sheet1". In other words, there are images for two signatures in one sheet of paper.

Therefore, here, as illustrated in Part (B) of FIG. 13, "Sheet1" is copied so that there are "Sheet1" and "Sheet2". At this stage, there are "BinderySignature1" and "BinderySignature2" for each of these "Sheet1" and "Sheet2".

Subsequently, as illustrated in Part (C) of FIG. 13, "BinderySignature2" is deleted from "Sheet1" so that only "BinderySignature1" remains, and "BinderySignature1" is deleted from "Sheet2" so that only "BinderySignature2" remains. As a result, each "Sheet" having one signature, i.e. "BinderySignature", is obtained by this division.

Whether the type of stitching, i.e. the side-stitching or the saddle-stitching, is checked in step S602 of FIG. 12, and when a result of the checking is the side-stitching, the flow proceeds to step S603 where a breaking position is added.

Figure 14:
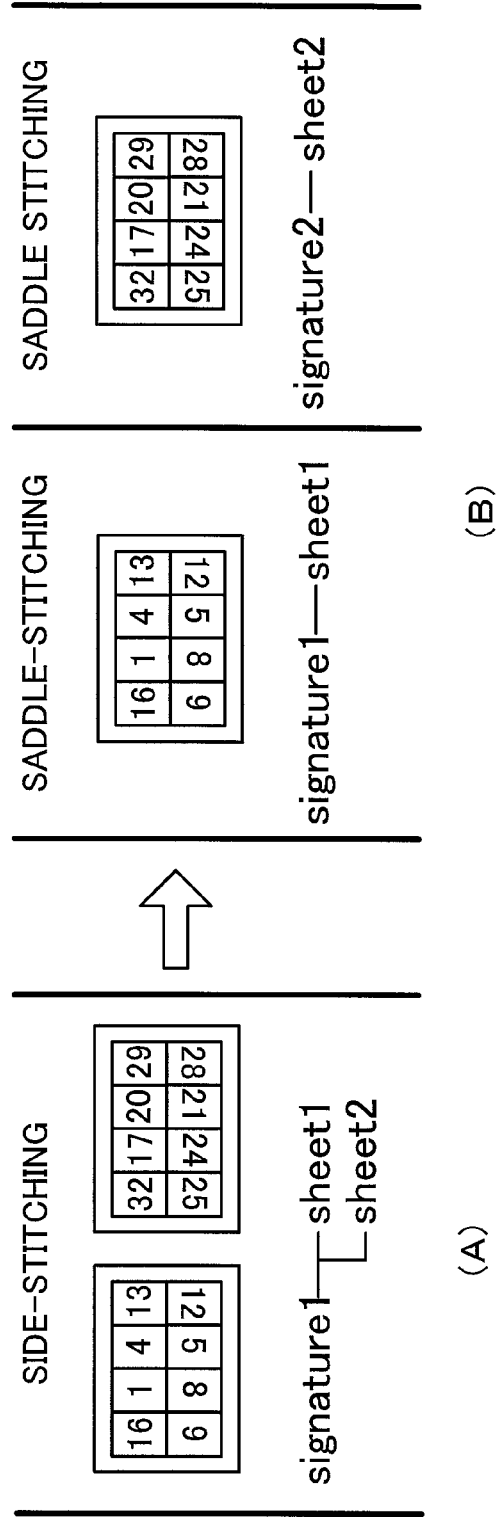
FIG. 14 is an explanatory diagram of the processing in step S602 and S603 of FIG. 12.

FIG. 14 is an explanatory diagram of the processing in step S602 and S603 of FIG. 12.

There are "Sheet1" and "Sheet2" under "Signature1" in Part (A) of FIG. 14. In this case, as illustrated in Part (B) of FIG. 4, they are separated into "Signature1" having only "Sheet1" and "Signature2" having only "Sheet2", and the saddle-stitching per sheet of paper is determined. This is to produce the POD-use layout setting information (JDF) by the saddle-stitching per sheet of printing paper.

Next, in step S604 of FIG. 12, a layout pattern of the signature is determined as two pages in each row×one page in each column.

In other words, here, based on the size of paper for a printer suitable for POD, two pages are laid out for each of the front and back sides of one sheet of paper.

Figure 15:
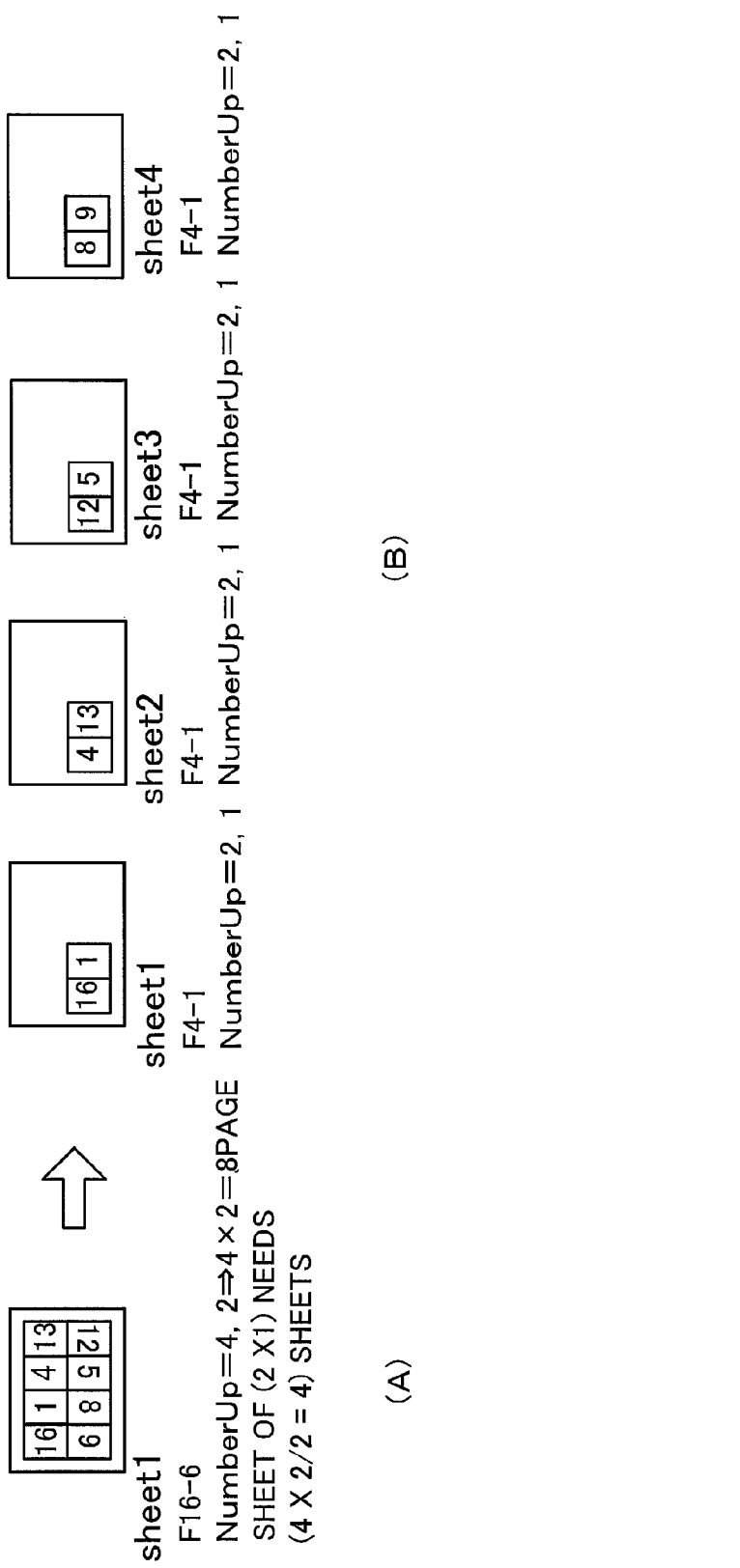
FIG. 15 is an explanatory diagram of the processing in step S604 of FIG. 12.

FIG. 15 is an explanatory diagram of the processing in step S604 of FIG. 12.

In one sheet of printing paper, a signature of "F16-6" is designated, and images are laid out for four pages in each row×two pages in each column on each of the front and back sides of the sheet (Part (A) of FIG. 15). As illustrated in Part (B) of FIG. 15, because images need to be laid out for two pages in each row×one page in each column on each of the front and back sides of a sheet of paper for POD, four sheets of paper are necessary. Here, the layout pattern of F16-6 is changed to the layout pattern of F4-1 for each of the four sheets of paper. An image of what page is placed on which part of the four sheets of paper is uniquely defined, based on the type F16-6 of signature before the change and the type F4-1 of signature after the change.

In step S605 of FIG. 12, the size of the paper is revised.

Figure 16:
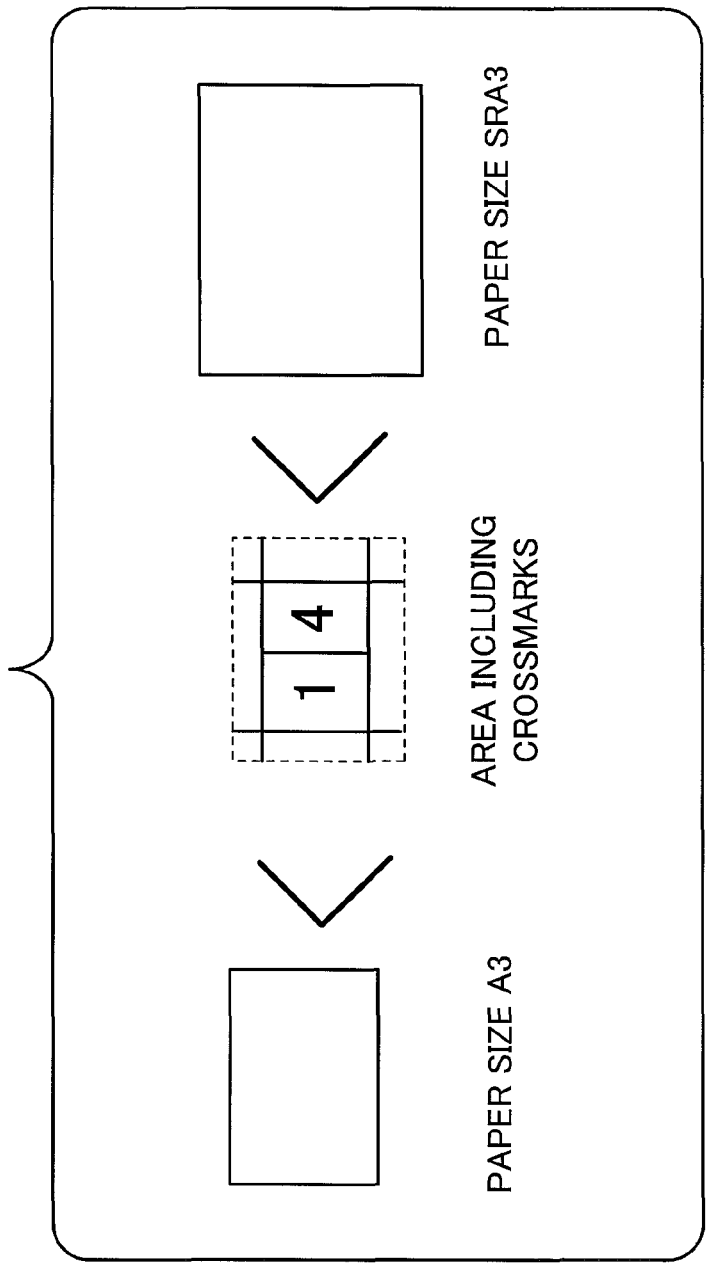
FIG. 16 is an explanatory diagram of the processing in step S605.

FIG. 16 is an explanatory diagram of the processing in step S605.

Here, the size of images for two pages as well as the size of an area including crossmarks used at the time of cutting are checked, paper of a minimum size covering the size of the area is determined, and the size of the paper is written at "Media" (see FIG. 11).

In the example illustrated in FIG. 16, when the size of the area including the crossmarks is larger than a paper size A3 and smaller than a paper size SRA3 that is slightly larger than the paper size A3, the paper size SRA3 is selected. Incidentally, here, a list describing available types of paper and the sizes of the respective types of paper is stored, and the list is referred to when the size of the paper is determined.

Further, in step S606 of FIG. 12, as illustrated in FIG. 17, centering processing is performed so that images for two pages are placed in the center of each sheet of the paper whose size is determined in step S605, and the position of the placed images is written at "Position" (see FIG. 11).

Through the processing described above, the POD-use layout setting information (JDF) illustrated in FIG. 11 is produced based on the printing-plate-use layout setting information (JDF) whose one example is illustrated in FIG. 10.

What is claimed is:

1. An image-data generation method comprising:
   a data acquisition step of acquiring first layout data that defines layout on a sheet of first paper and first image data described per page;
   a layout-data generation step of generating, based on the first layout data, second layout data that defines layout on a sheet of second paper having a size smaller than a size of the first paper; and
   an image-data generation step of generating, based on the first image data and the second layout data, second image data that represents an image per single side of the sheet of the second paper when an image for each page represented by the first image data is laid out on the sheet of the second paper according to the second layout data.

2. The image-data generation method according to claim 1, wherein the layout-data generation step comprises:
   a first change step of changing the first layout data to third layout data in which one signature is set per sheet of the first paper;
   a second change step of changing the third layout data to fourth layout data in which side-stitching is changed to saddle-stitching per sheet of the first paper; and
   a layout-data conversion step of converting the fourth layout data into the second layout data.

3. The image-data generation method according to claim 1, wherein the image-data generation step is a step of generating the second image data that represents a bitmap.

4. An image-data generation apparatus comprising:
   a data acquisition section that acquires first layout data that defines layout on a sheet of first paper and first image data described per page;
   a layout-data generation section that generates, based on the first layout data, second layout data that defines layout on a sheet of second paper having a size smaller than a size of the first paper; and
   an image-data generation section that generates, based on the first image data and the second layout data, second image data that represents an image per single side of the sheet of the second paper when an image for each page represented by the first image data is laid out on the sheet of the second paper according to the second layout data.

5. The image-data generation apparatus according to claim 4, wherein the layout-data generation section comprises:
   a first change section that changes the first layout data to third layout data in which one signature is set per sheet of the first paper;
   a second change section that changes the third layout data to fourth layout data in which side-stitching is changed to saddle-stitching per sheet of the first paper; and
   a layout-data conversion section that converts the fourth layout data into the second layout data.

6. The image-data generation apparatus according to claim 4, further comprising:
   a layout-data revision section that includes an operation section to be operated by an operator and revises the second layout data according to an operation of the operation section,
   wherein the image-data generation section generates the second image data according to the second layout data after revised by the layout-data revision section.

7. The image-data generation apparatus according to claim 6, wherein the layout-data revision section revises a bleed width according an operation of the operation section.

8. The image-data generation apparatus according to claim 6, wherein the layout-data revision section revises an amount of creep according an operation of the operation section.

9. The image-data generation apparatus according to claim 4, wherein the image-data generation section generates the second image data that represents a bitmap.

10. The image-data generation apparatus according to claim 4, further comprising an image-data transmission section that transmits the second image data generated in the image-data generation section to a printer that generates an image on the sheet of the second paper.

11. A non-transitory storage medium of storing an image-data generation program that causes, when executed in an arithmetic apparatus, the arithmetic apparatus to operate as an image-data generation apparatus comprising:
    a data acquisition section that acquires first layout data that defines layout on a sheet of first paper and first image data described per page;
    a layout-data generation section that generates, based on the first layout data, second layout data that defines layout on a sheet of second paper having a size smaller than a size of the first paper; and an image-data generation section that generates, based on the first image data and the second layout data, second image data that represents an image per single side of the sheet of the second paper when an image for each page represented by the first image data is laid out on the sheet of the second paper according to the second layout data.

12. The non-transitory storage medium according to claim 11, wherein the layout-data generation section comprises:
a first change section that changes the first layout data to third layout data in which one signature is set per sheet of the first paper;
a second change section that changes the third layout data to fourth layout data in which side-stitching is changed to saddle-stitching per sheet of the first paper; and
a layout-data conversion section that converts the fourth layout data into the second layout data.

13. The non-transitory storage medium according to claim 11, wherein
the arithmetic apparatus further comprises an operation section to be operated by an operator,
the image-data generation program causes the arithmetic apparatus to operate as the image-data generation apparatus further comprising a layout-data revision section that revises the second layout data according to an operation of the operation section, and
the image-data generation section generates the second image data according to the second layout data after revised by the layout-data revision section.

14. The non-transitory storage medium according to claim 13, wherein the layout-data revision section revises a bleed width according an operation of the operation section.

15. The non-transitory storage medium according to claim 13, wherein the layout-data revision section revises an amount of creep according an operation of the operation section.

16. The non-transitory storage medium according to claim 11, wherein the image-data generation section generates the second image data that represents a bitmap.

17. The non-transitory storage medium according to claim 11, wherein the image-data generation program causes the arithmetic apparatus to operate as the image-data generation apparatus further comprising an image-data transmission section that transmits the second image data generated in the image-data generation section to a printer that generates an image on the sheet of the second paper.

* * * * *